United States Patent [19]

Johnson et al.

[11] Patent Number: 5,213,832
[45] Date of Patent: May 25, 1993

[54] PROCESS FOR THE RECOVERY OF SUGAR FROM SUGAR FINES PRODUCED DURING THE SUGAR-COATING OF CEREAL

[75] Inventors: Bruce A. Johnson, Battle Creek; David A. Cronk, Ceresco, both of Mich.

[73] Assignee: Kraft General Foods, Inc., White Plains, N.Y.

[21] Appl. No.: 682,473

[22] Filed: Apr. 9, 1991

[51] Int. Cl.$^5$ ............................................. A23L 1/09
[52] U.S. Cl. .................................. 426/425; 426/478; 127/24; 127/53; 127/56
[58] Field of Search ................. 426/302, 305, 307, 96, 426/478, 425; 127/56, 53, 24

[56] References Cited

U.S. PATENT DOCUMENTS

| | | | |
|---|---|---|---|
| 968,327 | 8/1910 | Christianson | 127/56 |
| 1,101,940 | 6/1914 | Kopke | 127/56 |
| 1,156,060 | 10/1915 | Coombs | 127/56 |
| 1,990,382 | 2/1935 | Kellogg | 426/302 |
| 2,478,971 | 8/1949 | Lindgren | 127/56 |
| 2,992,140 | 7/1961 | Caiennie et al. | 127/56 |
| 3,501,346 | 3/1970 | Katzen et al. | 127/56 |
| 3,615,676 | 10/1971 | McKown | 426/293 |
| 3,976,793 | 8/1976 | Olson et al. | 426/302 |
| 4,046,789 | 9/1977 | Muller et al. | 426/478 |
| 4,501,759 | 2/1985 | Gajewski | 426/96 |

FOREIGN PATENT DOCUMENTS 3287499 11/1988 Japan ..................................... 127/56

Primary Examiner—Carolyn Paden
Attorney, Agent, or Firm—Thomas R. Marcoux; Linn I. Grim; Thomas R. Savoie

[57] ABSTRACT

In a process for applying a sugar solution to the surface of a cereal product, drying the sugar-coated cereal, collecting the fines produced therefrom and recycling the collected fines back into the original sugar solution the improvement that the fines can be contacted with water to form a slurry of dissolved sugar and insoluble cereal which is then separated into a liquid sugar fraction and an insoluble cereal fraction by centrifugation in a solid bowl centrifuge.

7 Claims, 1 Drawing Sheet

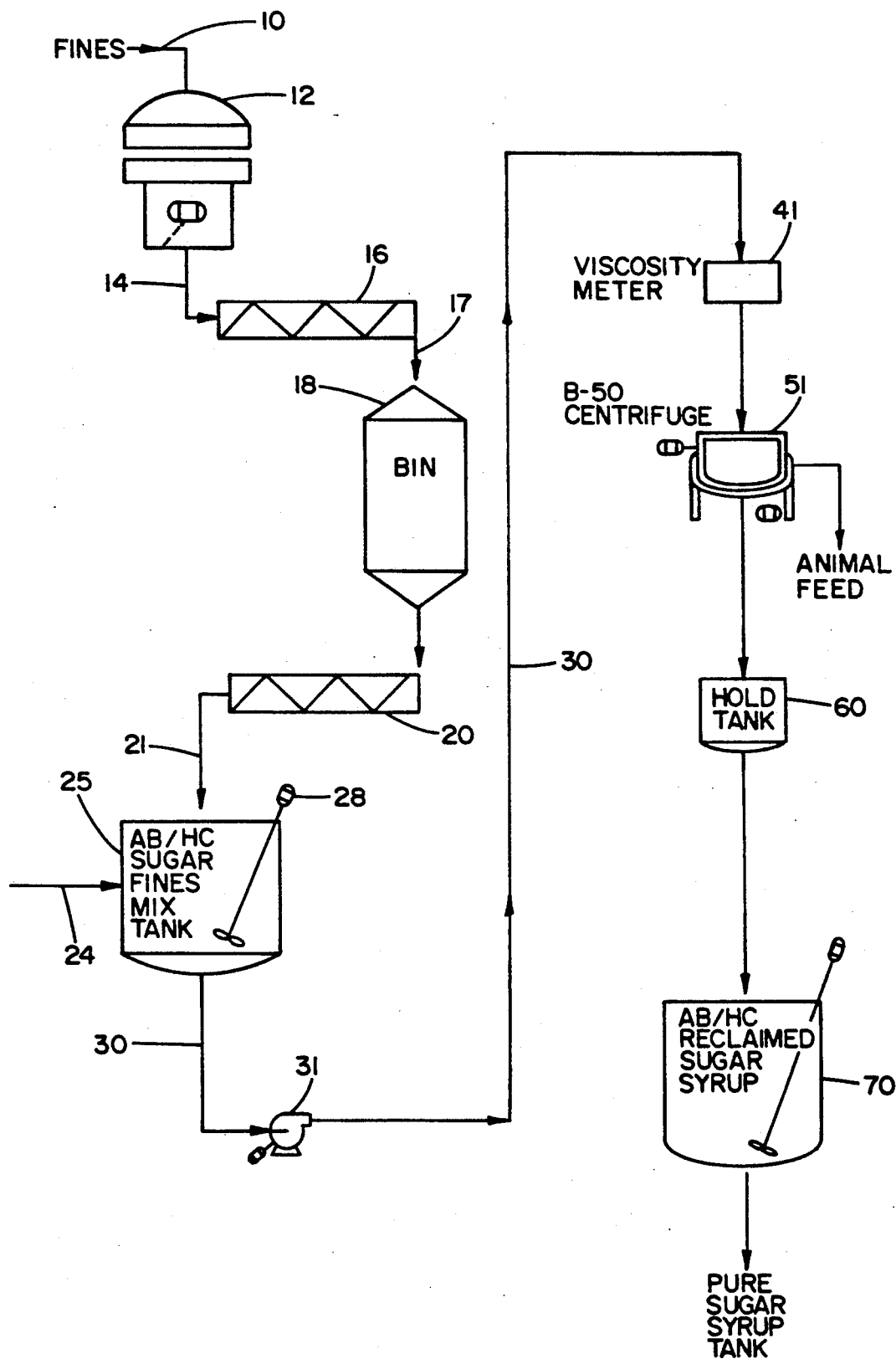

PROCESS FOR THE RECOVERY OF SUGAR FROM SUGAR FINES PRODUCED DURING THE SUGAR-COATING OF CEREAL

BACKGROUND OF THE INVENTION

1. Field of the Invention

This invention relates to pre-sweetened sugar-coated breakfast cereals and, more particularly, to the recovery of sugar from broken pieces of sugar-coated cereal that have fallen off or broken off the cereal product during production.

2. Description of Prior Art

Cereal pieces are typically prepared by cooking a cereal dough, shaping the dough into pellets or flakes and puffing or toasting the shaped dough. Pre-sweetened breakfast cereals have been regularly available to the consumer for several years. Such cereals have been prepared by first producing unsweetened cereal pieces, coating the cereal pieces with a sucrose slurry and drying the coated pieces in a dryer.

One approach for preparing breakfast cereal flakes is disclosed in U.S. Pat. No. 1,161,323. A grain such as corn grits is combined with salt, cane sugar and water. The combination is heated in a steam-tight cooker thereby cooking the grain material. The cooked grains are partially dried and then passed between spaced smooth-surfaced flaking rolls. The resulting flakes are puffed by baking or roasting. In other instances whole kernels of grain have been puffed to provide a breakfast cereal. U.S. Pat. No. 1,266,448 shows such a process in which rice kernels are soaked in water for 36 hours. The kernels are then subjected to heat until the kernel surface is dried. The dried kernels are popped in a popper much like popcorn.

A further process for preparing ready-to-eat breakfast cereals is described in U.S. Pat. No. 3,453,115. Cereal dough is prepared from any of various cereals such as corn, wheat, barley and oats. The dough is pressure cooked and pelletized. The pellets are partially dried to provide case hardening and then flaked between rolls.

The various ready-to-eat breakfast cereals have been sweetened by coating the finished cereal pieces with sugar. The previous unsweetened cereals have the disadvantage that table sugar, which is added to the cereal and milk mixture at the time of eating, is added in excess and remains in the bottom of the cereal bowl after the cereal has been consumed. The pre-sweetened cereals overcome such disadvantage and provide an appropriate amount of sugar which is not wasted.

U.S. Pat. No. 2,196,395 describes a process for candy-coating cereal in which the cereal is mixed with a hot sugar solution containing a fat or oil. The sugar solution can be in the form of molasses, glucose or cane sugar. The process is designed to permit the sugar-coating of relatively fragile cereal products, such as flakes, which may be damaged by other coating techniques, and is also stated to give the product good storage stability.

U.S. Pat. No. 2,333,442 describes the coating of a puffed cereal product with a honey-flavored candy coating. The coating is produced by contacting the cereal product with a hot solution containing sugar, honey flavoring and hardening agents. Following coating, the coated cereal is cooled to produce separation of the individual grains of sugar. It is stated that the process produces a hard coating which maintains its integrity and texture for long periods of time.

U.S. Pat. No. 4,211,800 discloses a flaked cereal product coated with sugar and oil to enhance both sweetness and storage stability. This process discloses a cereal flake in which the grain is either corn, wheat, or oats. The grain is first cooked and then dried to below 20% moisture. After tempering, the grains are heated to a temperature between 140° F. and 200° F. in order to produce a ppliable particle, The grains are then flaked, toasted, oil coated, and then sugar coated.

U.S. Pat. No. 3,615,676 discloses a sugar-coated ready-to-eat cereal. Sugar is applied to the surface of cereal pieces and caused to adhere thereto by moistening the cereal pieces with water and a binding agent.

U.S. Pat. No. 3,976,793 also shows sugar-coated ready-to-eat cereal flake. In this process, oat, soy & wheat flour are made into a dough. The dough is cooked, formed into pellets and then dried to a moisture content below 21%. The pellets are then flaked, toasted and sugar-coated.

All of the above sugar-coating processes have the disadvantage that a significant amount of sugar is lost due to breakage of the cereal. This breakage occurs whether the cereal is in the form of flakes, shreds, puffs or an extruded product. This breakage results in a high concentration of "dust" or "fines" which increases the cost of the final product. This is particularly true where the fines contain a high amount of sugar, say 65-90% sugar vs 10-35% cereal solids. Efforts to recycle the sugar-cereal fines into the pure sugar syrup which is used for coating the cereal have been limited since only small amounts (less than 6%) have been able to be added without deleteriously effecting the quality of the sugar coating. This is due to the presence of starch (from the cereal) in the recycled sugar.

Attempts to dissolve the sugar-cereal fines in water, and then separate the liquid sugar from the insoluble cereal (starch) particles by the use of filtration techniques has not worked due to plugging of the filters by the starches in the cereal and also by the mineral nutrients (zinc & iron) added to the cereal during production.

It would be very advantageous if the sugar fines could be dissolved, separated & purified to a point where more than 6% and as high as 20-30% of the reclaimed sugar could be recycled or added back to the original sugar syrup used for coating the cereal products.

SUMMARY OF THE INVENTION

The present invention relates to an improvement in the process for applying a sugar solution to the surface of a cereal product, drying the sugar-coated cereal, collecting the fines of sugar and cereal produced therefrom, and recycling said collected fines back into the original sugar solution.

It has now been found that the sugar-cereal fines can be contacted with water to form a slurry of dissolved sugar and insoluble cereal particles, which then can be separated into a liquid sugar fraction and an insoluble cereal fraction by centrifugation in a solid bowl centrifuge.

This is accomplished by following these steps: collecting fines having (by weight) a sugar content of 65-90% sugar and a cereal content of 10-35%; forming a slurry of the sugar-cereal fines with water at a temperature of 130° to 175° F. and a water: fines ratio (by weight) of between 0.7:1.0 and 1.5:1.0; mixing the slurry vigorously for 2 to 30 minutes to dissolve all the sugar fines and wet all the cereal fines; adjusting the water content of the slurry to achieve a specific gravity of between 1.18 to 1.40; separating the dissolved sugar from the wet cereal fines by the use of centrifugation in a solid bowl centrifuge; recycling the dissolved sugar into the pure sugar solution.

In the case where the collected fines have a sugar content of 80–90% and a cereal content of 10–20%, a preferred ratio of water:fines in the slurry is about 0.9:1.0, a preferred mixing time is 5 minutes, and a preferred specific gravity prior to centrifugation to separate the sludge from the sugar solution is a specific gravity of 1.28.

In the case where the collected fines have a sugar content of 65–70% and a cereal content of 30–35%, the preferred water:fines ratio in the slurry is 1.3:1, the slurry is mixed for 20 minutes, and the final specific gravity prior to centrifugation should be 1.20.

BRIEF DESCRIPTION OF THE DRAWING

The accompanying drawing is a diagrammatic flow sheet illustrative of one embodiment of a sugar recovery process in accordance with the present invention. While the process is described in connection with the recovery of sugar from broken pieces of a dried, sugar-coated puffed cereal, it is to be understood that recovery of sugar from other sugar-coated cereal products such as flaked, shredded, extruded or ground cereal can be effected in essentially the same manner. The sugar in the examples is sucrose, but fructose, glucose, dextrose or any other sugar suitable for coating cereals can be employed. The process contemplates the use of known and conventional equipment which is readily available from several suppliers.

DETAILED DESCRIPTION OF THE INVENTION

Prior to forming the aqueous slurry of fines, it is preferred to sift the fines in a sifter to increase the density of the cereal particles present in the sugar fines. These sifted fines have a mesh size of between 20 and 60 mesh (U.S. Standard Sieve), preferably 30 to 50 mesh. This enables the cereal particles to be wet or suspended within the slurry as distinguished from floating on the surface of the slurry. Any floaters can be skimmed off the surface of the slurry.

In forming the slurry it is only necessary to use sufficient water to completely dissolve the sugar in the fines while wetting the cereal particles which will remain insoluble. The ratio of water added on a weight basis is about 1:1 but may vary between 0.7:1.0 and 1.5:1.0. Preferably, the ratio of water:fines is between 0.9:1.0 and 1.3:1.0. In the case where the cereal levels in the fines approaches 35%, the ratio of water:fines may approach 1.4:1.0 to achieve proper wetting of the cereal fines. The temperature of the water in contact with the fines is preferably 170° F. but can range from 130° to 175° F. The temperature of the water should be sufficient to dissolve all the sugar present in the fines but sufficiently below the temperature where the water could vaporize or "boil."

After the slurry is formed, it is necessary to vigorously mix or agitate the slurry to achieve maximum contact of the water with the surface of the fines. This will dissolve the sugar while effectively wetting the insoluble cereal particles. Where the fines have a cereal content of 10–20% about 5 minutes of mixing is needed to achieve the wetting action necessary to dissolve all the sugar in the fines while at the same time wetting the insoluble cereal particles. Where the sugar content approaches 65% and the cereal content approaches 35%, it may be necessary to agitate or mix the slurry vigorously for about 20 minutes to achieve the necessary wetting action of the cereal particles.

Once all the sugar is dissolved and the cereal particles are sufficiently wet, the slurry water content is adjusted to achieve a specific gravity of between 1.18 and 1.40. In the case of a puffed cereal product having fines with a sugar content of 80–90% and a cereal content of 10–20%, the preferred specific gravity is 1.28. In the case of puffed cereal fines containing up to 65% sugar and up to 35% cereal, the preferred specific gravity is 1.20.

At the above specific gravities, the slurry is easily separated by the centrifugal action of a solid bowl centrifuge into an insoluble sludge (cereal particles) and a relatively pure liquid sugar solution. The use of perforated bowl centrifuges does not work due to plugging of the holes in the centrifuge by the starches, zinc & iron present in the cereal product. The reclaimed sugar solution can be blended back or recycled to the original sugar syrup used for coating the cereal at a level of 10 to 20%, and as high as 30% without effecting the quality of the sugar coating on the cereal.

Cereal products suitable for sugar-coating by the process of the invention are well known to those skilled in the art and hence it is unnecessary to describe in detail the production of such cereal products. The choice of an appropriate flour and other components of the dough used to form the cereal products is of course governed largely by the taste and texture desired in the final coated cereal product. It has been found that doughs based on corn flour, oat flour, rice flour and wheat flour give good results in the process of the invention.

The exact geometric form of the cereal product subjected to the process of the invention is not critical and any of the forms of cereal product which will be familiar to those skilled in the art may be used. For example, the cereal product may be in flake form, shredded form, gun-puffed form or extruded form. When an extruded form is used, the extruded cereal product may be in the form of spherical pieces, such as those used in certain commercially-available breakfast cereals.

In general, it is desirable that the moisture content of the cereal product, prior to contact with the sugar solution, be in the range of 1 to 10% by weight. The sugar solution may employ any sugar, such as sucrose, fructose, glucose, or other known sugars familiar to the art. In order to ensure a uniform coating of the cereal product with the sugar solution, it is preferred that the sugar solution be applied to the cereal product by spraying. Most uniform application of the sugar solution is promoted by agitating a mass of particles of cereal product while spraying sugar solution onto the mass from above. Those skilled in the art of food technology will be familiar with rotatable drums provided with internal baffles which can be used to tumble or agitate and transfer a mass of particles of cereal product in a way that allows a coating to be very uniformly applied, and such drums are suitable for use in the application of the sugar solution in the process of the instant process.

Normally, it will be most convenient to coat the whole surface of the particles of cereal with the sugar solution. However, we do not exclude the possibility that the sugar solution might be applied only to part of the surface of the cereal particles, for example by dipping large particles into a shallow bath of the sugar solution.

The preferred concentration of sugar solution for use in the process of the invention is from 60 to 85% by weight. If the sugar solution is too dilute, it may be insufficiently sticky to promote adhesion of the flavoring composition to the cereal product and renders the drying of the product difficult and inefficient because of the large quantity of water which must be removed to deposit a given quantity of sugar. On the other hand, while if the sugar solution is too concentrated, it may become viscous, difficult to spray and difficult to apply uniformly in a thin layer to the cereal product.

It is desirable to incorporate an emulsified oil into the sugar solution. The presence of such oil produces better flow of the solution through any nozzle or spray heads used to spray the solution onto the cereal product. In addition, the presence of the emulsified oil promotes foaming of the sugar solution in contact with the cereal product. A foamy layer of sugar solution is desirable in order to give a frosted appearance to the product. We have found that best results are obtained by incorporating from about 0.5 to about 5% by wt. of oil into the sugar solution. Obviously, the oil used must be edible and should also be relatively easy to emulsify in the sugar solution. Preferably, the weight of sugar solution applied to the cereal product is from about 15 to 65% by wt. of the cereal product.

DESCRIPTION OF THE PREFERRED EMBODIMENT

EXAMPLE 1

Referring to the drawing, fines (broken pieces of dried sugar-coated puffed oat cereal) from the production of "Alpha-Bits" are introduced through line 10 into sifter 12 which sifts out the larger sized pieces to give a mesh size of 30-50 mesh (US Standard Sieve). The fines (80-90% sugar and 10-20% cereal on a dry weight basis) drop through line 14 onto auger 16 which feeds the fines through line 17 into loading bin 18. When the bin 18 reaches 900 lbs of fines, 850 lbs of water at 170° F. enters the mix tank 25 through line 24. As soon as the water shuts off, the mix tank agitator 28 starts running at 1,450 r.p.m. When the loading bin 18 reaches 1,000 lbs of sugar fines and the mix tank 25 is less than 65% full, the augur 20 & slidegate (not shown) below the bin 18 turn on & open respectively. Also, at this point, a diverter (not shown) which empties the fines into bin 18 through line 17 diverts the fines into another holding bin (not shown).

When the loading bin 18 drops below 900 lbs while emptying, the diverter then diverts the fines back into the loading bin 18. The slidegate and augur 20 below the bin 18 remain open for 21½ minutes and 22 minutes respectively. After augur 20 shuts off, the mix tank agitator 28 runs for 5 minutes, then shuts off.

Pump 31, viscosity meter 41, and centrifuge 51 are then turned on. The sugar slurry in mix tank 25 is pumped through line 30 into the viscosity meter 41 and recirculated back into the mix tank 25. The viscosity meter 41 is a Flow Meter (Model #DL1005202) manufactured by Micro Inc., 2505 S. Finley Road, Lombard, Ill. 60148. This meter is capable of detecting the permissible slurry temperature (130° to 175° F.), the permissible brix level (45 to 60), and the permissible specific gravity (1.18 to 1.40).

In this example, the meter will read a slurry temperature of 155° F., a brix level of 57 and a specific gravity of 1.3. Since a specific gravity of 1.28 is preferred for the sugar: cereal ratio of this example, a 3-way control value opens and allows 80 lbs of additional water to enter the mix tank 25. The specific gravity will now read 1.28 and the 3-way value which recirculates back to the mix tank 25, switches and allows liquid slurry to go into a solid bowl centrifuge 51. This centrifuge is manufactured by AML Industries, 3500 Davisville Road, Hatboro, Pa. 19040. The centrifuge has a Model #B50 and Serial #5112, Speed Setting of 1,750 r.p.m., and a Stop Time Setting of 3 minutes. (The speed is reduced to 1,450 r.p.m. with an Allen Bradley Model #1336 frequency controller while the stop time is reduced to 2-30 seconds with an Allen Bradley dynamic brake used in conjunction with the 1336 frequency controller).

As the dissolved sugar liquid passes through the solid bowl centrifuge 51, the cereal solids are separated from the liquid sugar by the centrifugal action of the bowl and deposited on the inside of the bowl. After 4 minutes a discharge tube turns on for 20 seconds and uses centripetal force to clean out the bowl. The cereal solids are discharged through line 53 and used for animal feed.

The liquid sugar is gravity fed into a small holding tank 60. After the tank 60 reaches about 35% full, a level indicator turns on a pump and pumps the liquid sugar into the reclaimed sugar syrup tank 70 until the small holding tank 60 reaches 5% full. The reclaimed syrup from tank 70 is blended with the pure liquid sugar used for sugar-coating the puffed cereals at a blend ratio of 7 to 20%.

EXAMPLE 2

The procedure of Example 1 is repeated for "Honey Comb" (a sugar-coated puffed cereal of wheat and corn). This cereal has a sugar level of 65-70% and a cereal level of 30-35% in the collected fines. When the bin 18 reaches 900 lbs of fines, 1,200 lbs of water (instead of 850 lbs of water enteres the mix tank 25 through line 24. After auger 20 shuts off, the mix tank agitator 28 runs for about 20 minutes (instead of 5 minutes) and then shuts off. Since a specific gravity of 1.20 has been found to give the best separation results for the fines of this example, the water:fines mixture is adjusted to achieve a specific gravity of 1.20.

The slurry is then passed through the solid bowl centrifuge 51 to separate the cereal sludge from the liquid sugar. After 3½ minutes (instead of 4 minutes) the discharge tube turns on for 30 seconds (instead of 20 seconds) and uses centripetal force to clean out the bowl.

It will be apparent to those skilled in the art that various changes can be made in the preferred embodiments without departing from the scope of the invention. Accordingly, the foregoing discription should be construed as illustrative and not limiting, the scope of the invention being defined solely by the appended claims.

What is claimed is:

1. In a process for applying pure sugar solution to the surface of a cereal product, drying the sugar-coated cereal, collecting the fines of sugar and cereal produced therefrom, and recycling said fines into the pure sugar solution the improvement which comprises:
   collecting fines having (by weight) a sugar content of 65-90% and a cereal content of 10-35%;

forming a slurry of the sugar and cereal fines with water at a temperature of 130° to 175° F. and a water:fines ratio (by weight) of between 0.7:1 and 1.5:1;

mixing the slurry vigorously for 2 to 30 minutes to dissolve all the sugar fines and wet all the cereal fines;

adjusting the water content of the slurry to achieve a specific gravity of between 1.18 to 1.40;

separating the dissolved sugar from the wet cereal fines by centrifugation in a solid bowl centrifuge;

recycling the dissolved sugar into the pure sugar solution.

2. The process of claim 1 wherein the water:fines ratio in the slurry is between 0.9:1 and 1.3:1.

3. The process of claim 2 wherein the fines are sifted to a mesh size of between 20 and 60 mesh (U.S. Standard Sieve).

4. The process of claim 2 wherein the fines are sifted to a mesh size of between 30 and 50 mesh (U.S. Standard Sieve).

5. The process of claim 4 wherein the slurry is mixed for 5 to 20 minutes.

6. The process of claim 5 wherein the sugar-cereal fines have a sugar content of 80-90% and a cereal content of 10-20%, the water:fines ratio in the slurry is about 0.9:1, the slurry is mixed for 5 minutes, and the specific gravity of the slurry is adjusted to 1.28 prior to centrifugation.

7. The process of claim 6 wherein the sugar-cereal fines have a sugar content of 65-70% and a cereat content of 30-35%, the water:fines ratio in the slurry is about 1.3:1, the slurry is mixed for 20 minutes, and the specific gravity of the slurry is adjusted to 1.20 prior to centrifugation.

* * * * *

UNITED STATES PATENT AND TRADEMARK OFFICE
CERTIFICATE OF CORRECTION

PATENT NO. : 5,213,832
DATED : May 25, 1993
INVENTOR(S) : Bruce A. Johnson, et al.

It is certified that error appears in the above-indentified patent and that said Letters Patent is hereby corrected as shown below:

Column 2, line 1: "dlscloses" should read as --discloses--

Column 2, line 8: "ppliable" should read as --pliable--

Column 8, line 13: "cereat" should read as --cereal--

Signed and Sealed this

Twenty-ninth Day of March, 1994

Attest:

BRUCE LEHMAN

*Attesting Officer*    *Commissioner of Patents and Trademarks*